(12) United States Patent
Murakami et al.

(10) Patent No.: US 8,303,027 B2
(45) Date of Patent: Nov. 6, 2012

(54) FRONT WINDOW FORMED IN CABIN OF CONSTRUCTION MACHINE

(75) Inventors: Yoshiaki Murakami, Hiroshima (JP); Masafumi Yoneda, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/094,087

(22) Filed: Apr. 26, 2011

(65) Prior Publication Data

US 2011/0291443 A1 Dec. 1, 2011

(30) Foreign Application Priority Data

May 27, 2010 (JP) .................................. 2010-121334

(51) Int. Cl.
*B60J 1/06* (2006.01)

(52) U.S. Cl. ...... 296/190.1; 296/84.1; 296/93; 296/96.2

(58) Field of Classification Search ............... 296/190.1, 296/146.16, 84.1, 89, 96.11, 201, 146.15, 296/93, 96.2, 96.21, 96.22
See application file for complete search history.

(56) References Cited

U.S. PATENT DOCUMENTS

| | | | | |
|---|---|---|---|---|
| 4,072,338 | A * | 2/1978 | Lawrence et al. | 296/190.1 |
| 4,518,195 | A * | 5/1985 | Tindall et al. | 296/148 |
| 5,273,340 | A * | 12/1993 | Nelson et al. | 296/190.08 |
| 5,362,118 | A * | 11/1994 | Houriez | 296/96.21 |
| 6,729,031 | B2 * | 5/2004 | McKee | 52/204.1 |
| 7,367,611 | B2 * | 5/2008 | Fujii et al. | 296/190.1 |
| 2009/0026803 | A1 * | 1/2009 | Yano et al. | 296/190.1 |
| 2011/0291443 | A1 * | 12/2011 | Murakami et al. | 296/190.1 |

FOREIGN PATENT DOCUMENTS

| | | |
|---|---|---|
| JP | 6-42328 | 6/1994 |
| JP | 2004-27700 | 1/2004 |

* cited by examiner

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

Provided is a front window formed in a cabin including an upper window formed in a front face of the cabin and having a window frame with an underside portion, and a lower window disposed below the upper window so as to contact the upper window, while being capable of inhibiting condensed water from building up on the underside portion and rusting the underside portion. The upper window is provided with a glass plate having a periphery to be attached to an outer face of the window frame, defining a clearance between the underside portion and the glass plate to let out the condensed water generated on an inner face of the glass plate downwardly from the underside portion.

5 Claims, 3 Drawing Sheets

FRONT WINDOW FORMED IN CABIN OF CONSTRUCTION MACHINE

BACKGROUND OF THE INVENTION

1. Field of the Invention

The present invention relates to a front window formed in a front face of a cabin of a construction machine such as a hydraulic shovel.

2. Description of the Background Art

The background art of the invention will be explained by describing a cabin 1 of a hydraulic shovel shown in FIG. 4, as an example.

The cabin 1, which is adapted to accommodate various operation devices therein, includes a door 2 disposed on the left side of the operation devices and a front window 3 disposed on the front side of the cabin 1. The front window 3 includes an upper window 4 capable of being opened/closed, e.g. capable of vertically sliding, and a lower window 5 disposed below the upper window 4 to make contact with the upper window 4. The upper window 4 has an unillustrated window frame, and a glass plate 6 adhered to an outer face of the window frame. Similarly to the upper window 4, the lower window 5 has a window frame and a glass plate 7. The glass plate 6 of the upper window 4 and the glass plate 7 of the lower window 5 have respective ends which make contact with each other, between which ends a shock-absorbing trim 8 is provided.

FIG. 5 and FIG. 6 show a conventional example of a structure of the thus mutually contacting ends of the upper window 4 and the lower window 5 in the front window 3.

The window frame of the upper window 4 has an underside portion 9, to which a reinforcing plate 11 and a lower handle 12 for opening and closing the upper window 4 are attached. The underside portion 9 is formed of a base wall 9a disposed in an upright posture along the glass plate 6, and a bulging wall 9b extending from a lower end of the base wall 9a, obliquely upward, toward the inner side of the cabin, i.e., toward the right side in FIG. 5 and FIG. 6, thus having a V-shaped cross section. The base wall 9a has an outer surface, to which the glass plate 6 is attached via a block-shaped shock-absorbing rubber member 10. The reinforcing plate 11 is attached to an upper face of the bulging wall 9b. Specifically, the reinforcing plate 11 has an oblique portion fixed to the upper face of the bulging wall 9b along the upper face thereof and an upper portion extending upward from the upper end of the oblique portion.

The structure shown in FIG. 5 and FIG. 6 is not described in a printed publication. Meanwhile, there exist some documents describing the related art of the invention Japanese: Unexamined Patent Publication No. 2004-27700 and Japanese Unexamined Utility Model Publication No. Hei 6-42328.

The underside portion 9 of the window frame of the upper window 4 shown in FIG. 5 and FIG. 6 is continuous with an inner face of the glass plate 6 of the upper window 4 through the shock-absorbing rubber member 10 in a step form. This form intends to allow water condensed into dew (described "condensed water" below) W on the inner face of the glass plate 6 due to a temperature difference between the inside and the outside of the cabin to arrive at the underside portion 9 to build up thereon through moving on the glass plate 6 and the shock-absorbing rubber member 10; the build up of the condensed water may rust the underside portion 9 (particularly, an upper end face of the base wall 9a).

SUMMARY OF THE INVENTION

An object of the invention is to provide a front window formed in a cabin including an upper window and a lower window, the upper window having a window frame with an underside portion, the front window being capable of inhibiting condensed water from building up on the underside portion to rust the underside portion. Specifically, the front window according to the invention includes an upper window formed in a front face of the cabin and a lower window disposed below the upper window so as to make contact with the upper window. The upper window includes a window frame having an underside portion and a glass plate having a periphery to be attached to an outer face of the window frame in such a manner as to define a clearance between the underside portion of the window frame of the upper window and the glass plate to let out condensed water generated on an inner face of the glass plate downwardly from the underside portion through the clearance.

These and other objects, features and advantages of the present invention will become more apparent upon reading the following detailed description along with the accompanying drawings.

DESCRIPTION OF THE PREFERRED EMBODIMENTS

Figure 1:
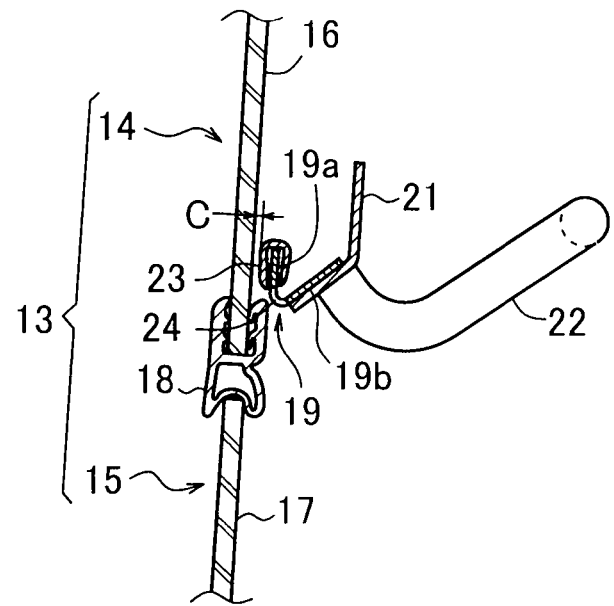
FIG. 1 is a partial elevational cross-sectional view of a front window formed in a cabin embodying the invention.
Figure 2:
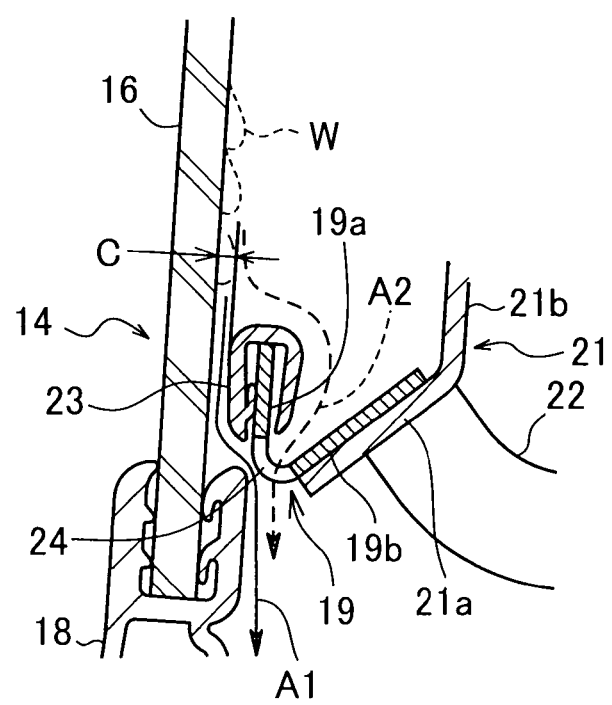
FIG. 2 is a partially enlarged view of FIG. 1.
Figure 3:
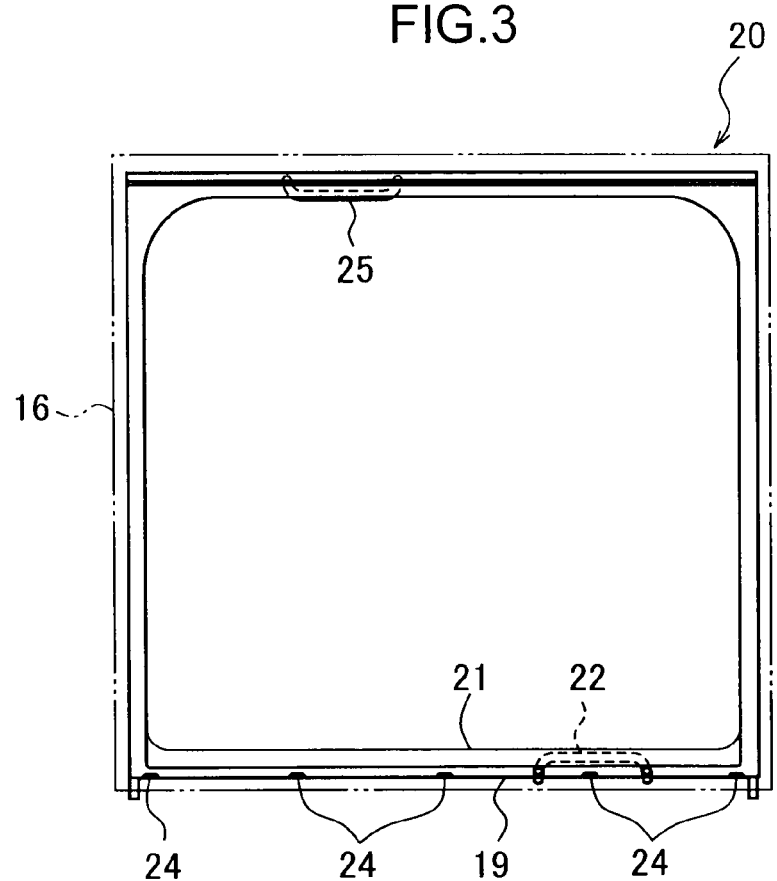
FIG. 3 is a front view of a window frame of an upper window of the front window.
Figure 4:
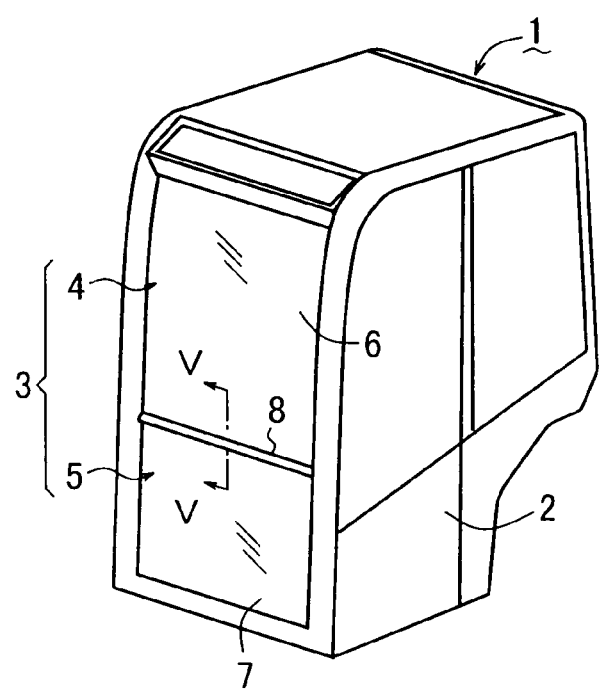
FIG. 4 is a schematic perspective view showing an example of a cabin of a hydraulic shovel to which the invention is applicable.

An embodiment of the invention is described referring to FIGS. 1 to 3. The embodiment is an example where the invention is applied to a front window 13 of a cabin of a hydraulic shovel. The front window 13 is the same as the front window 3 shown in FIG. 5 and FIG. 6 with respect to the following points.

i) The front window 13 comprises an upper window 14, which is capable of being opened/closed, e.g. capable of vertically sliding, and a lower window 15 which is disposed below the upper window 14 so as to make contact with the upper window 14.

ii) The upper window 14 has a window frame 20 as shown in FIG. 3 and a glass plate 16 with a periphery to be adhered to an outer face of the window frame 20. Similarly to the upper window 14, the lower window 15 has a window frame and a glass plate 17. The glass plates 16 and 17 have a lower end and an upper end, respectively, between which ends a shock-absorbing trim 18 is interposed.

iii) The window frame 20 of the upper window 14 has an underside portion 19. The underside portion 19 is constituted of a base wall 19a and a bulging wall 19b bulging from a lower end of the base wall 19a toward the inner side of the cabin, i.e., obliquely upward toward the right side in FIG. 1 and FIG. 2, thus having a V-shape in entire cross section. The base wall 19a is disposed along the glass plate 16 and spaced therefrom, specifically disposed in an upright posture, in this embodiment.

Figure 5:
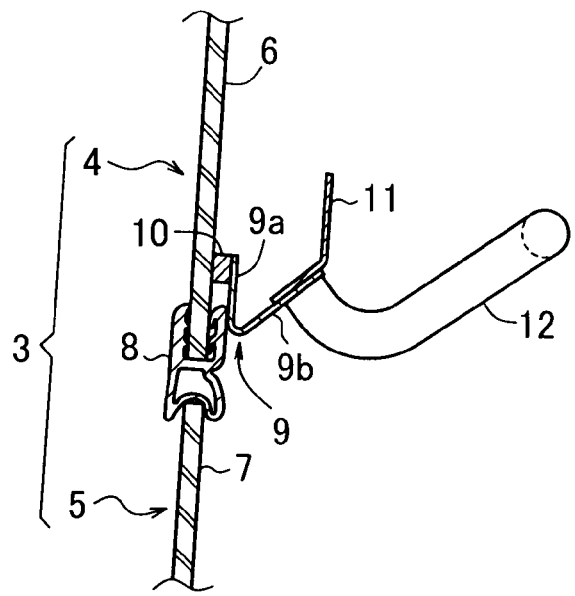
FIG. 5 is a partial vertical sectional view of a conventional front window formed in a cabin.
Figure 6:
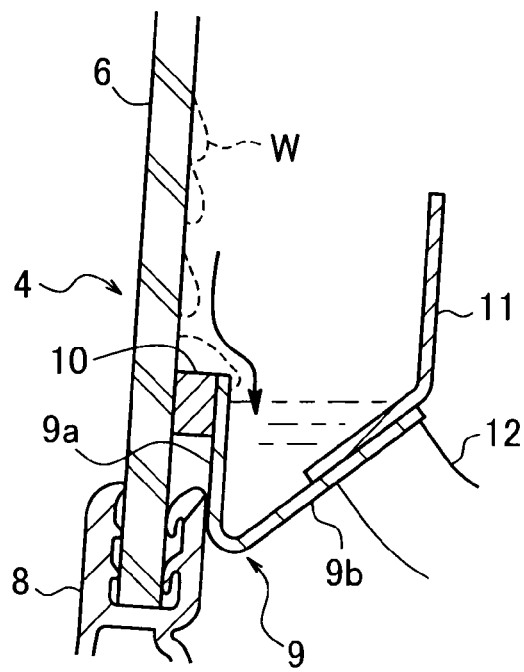
FIG. 6 is a partially enlarged view of FIG. 5.

In the front window 13 according to the embodiment, the periphery of the glass plate 16 is adhered to a part or the entirety of the region except the underside portion 19 in the window frame 20, in other words, only to a part or the entirety of the region including the upper side portion and left and right side portions in the window frame 20, while not adhered to an outer face of the underside portion 19. The underside portion 19 is provided with a trim 23 having such a shape as shown in FIG. 1 and FIG. 2, in place of the shock-absorbing rubber member 10 block-shaped as shown in FIG. 5 and FIG. 6. The trim 23 is a shock absorbing member made of an elastic material such as rubber to absorb a mechanical shock transmitted from the underside portion 19 to the glass plate 16. The trim 23 is attached to the base wall 19a of the underside portion 19 so as to cover an upper end of the base wall 19a at both of the front and back sides thereof.

There is defined a clearance C between the glass plate 16 and a region of the trim 23 which region covers the upper end of the base wall 19a at the back side thereof, in other words, from the side of the glass plate 16. The clearance C has a size enough to let out condensed water generated on the inner face of the glass plate 16 downwardly from the underside portion 19 through the clearance C. The clearance, in this embodiment, is continuous over the entire region of the underside portion 19 with respect to the longitudinal direction thereof.

The underside portion 19 has a bottom portion where the lower end of the base wall 19a and a lower end of the bulging wall 19b are joined to each other; the bottom portion is formed with a plurality of water drainage holes 24 each vertically passing through the bottom portion. The water drainage holes 24 are formed in respective plural positions spaced by a certain interval widthwise of the front window 13 (in the example shown in FIG. 3, both end positions and an intermediate position of the bottom portion).

The upper window 14 of the embodiment is provided with a reinforcing plate 21 and a lower handle 22, in addition to the underside portion 19. The reinforcing plate 21 integrally has an attachment portion 21a inclined along a lower face of the bulging wall 19b and an upper side portion 21b vertically rising from an upper end of the attachment portion 21a, the attachment portion 21a connected to the lower face of the bulging wall 19b. The lower handle 22 is attached to a lower face of the attachment portion 21a of the reinforcing plate 21 to be gripped by the operator for opening/closing the upper window 14. In this embodiment, the window frame 20 is also provided with an upper handle 25 at an upper portion thereof for opening/closing operation.

In this front window 13, the clearance C defined between the trim 23 attached to the underside portion 19 of the window frame 20 of the front window 13 and the glass plate 16 allows the condensed water W generated on the inner face of the glass plate 16 to be let out downwardly from the underside portion 19 through the clearance C, as shown by the solid-line arrow A1 in FIG. 2. This prevents the condensed water W from building up on the base wall 19a and the bulging wall 19b of the underside portion 19, thus preventing the water from rusting the underside portion 19a. Furthermore, the prevention of the water from building up requires no additional water drainage component such as a water drainage member, or modification of the underside portion 19 to a complicated shape for smooth water drainage; thus involving little increase in cost.

Moreover, this embodiment includes the trim 23, which is attached to the base wall 19a of the underside portion 19 in such a manner as to cover the upper end thereof and defines the clearance C between the trim 23 and the glass plate 16; the trim 23 is, therefore, capable of enhancing the effect of preventing the upper end of the base wall 19a which is most likely to be rusted out of the underside portion 19 from the rust, while serving as a shock absorber for the glass plate 16 similarly to, for example, the shock-absorbing rubber member 10 shown in FIG. 5 and FIG. 6.

Furthermore, even if the condensed water W is intruded to the inner side of the underside portion 19, the water drainage holes 24 provided in the bottom portion of the underside portion 19 can promote the discharge of the water W. For instance, when a large temperature difference between the inside and the outside of the cabin generates a lot of condensed water W on the inner face of a glass plate, particularly in a wintertime, the condensed water W may overshoot the clearance C and the trim 23 and flow into the underside portion 19, as shown by the broken-line arrow A2 in FIG. 2; however, the water having thus flowed into the underside portion can be discharged downwardly from the underside portion 19 through the water drainage holes 24.

In particular, this embodiment, including the water drainage holes 24 which are formed in the bottom portion of the underside portion 19, in other words, in a portion where the lower end of the base wall 19a and the lower end of the bulging wall 19b are connected (so-called valley bottom portion), allows the water having flowed into the bottom portion to be quickly and securely discharged through the water drainage holes 24. This ensures the prevention of the underside portion 19 from rusting.

Besides, since the attachment portion 21a of the reinforcing plate 21 is not attached to the upper face but to the lower face of the bulging wall 19b of the underside portion 19, conversely to the structure shown in FIG. 5 and FIG. 6, the bulging wall 19b can inhibit the condensed water W entered to the bottom portion from contact with the attachment portion 21a, thereby preventing the reinforcing plate 21 from rusting.

The invention is not limited to the foregoing embodiment, including, for instance, the following modifications.

The cross section of the underside portion is not limited to a V-shape like the underside portion 19 of the window frame 20 of the upper window 14 in the above embodiment as shown in FIG. 1 and FIG. 2. The underside portion may have an L-shape in cross section where a base wall and a horizontal bulging wall intersect substantially orthogonal to each other, or may have a base wall and a bulging wall which includes a horizontal portion continuing to the base wall and a portion rising from an end of the horizontal portion, the base wall and the bulging wall forming an U-shaped section of the underside portion.

The term "clearance" according to the invention is not limited to one continuous over the entire region of the underside portion with respect to the window width direction. As far as the condensed water is allowed to be discharged, the clearance C may be discontinuous: for instance, there may be interposed a shock-absorbing rubber member between the glass plate 16, and the underside portion 19 or the trim 23, at a certain site (one location or locations) of a part of the underside portion 19 in the width direction thereof shown in FIGS. 1 to 3 to locally fill the clearance C so as to make the clearance C discontinuous.

As described above, the invention provides a front window formed in a cabin including an upper window and a lower window, the upper window having a window frame with an underside portion, the front window being capable of inhibiting condensed water from building up on the underside portion to rust the underside portion. Specifically, the front window according to the invention includes an upper window formed in a front face of the cabin and a lower window disposed below the upper window so as to make contact with the upper window. The upper window includes a window frame having an underside portion and a glass plate having a periphery to be attached to an outer face of the window frame. The periphery of the glass plate is attached to the window frame in such a manner as to define a clearance between the underside portion of the window frame of the upper window and the glass plate to let out condensed water generated on an inner face of the glass plate downwardly from the underside portion through the clearance.

According to the front window, the clearance defined between the underside portion of the window frame of the upper window and the glass plate allows the condensed water generated on the inner face of the glass plate to be let out downwardly flow from the underside portion through the clearance, thereby inhibiting the condensed water from building up on the underside portion and preventing the underside portion from rusting. Furthermore, there is no need for an additional water drainage component such as a water drainage member or modification of the underside portion into a complicated shape to prevent the condensed water from building up, which enables the prevention of the underside portion from rusting to be performed with little increase in cost.

The front window according to the invention may, preferably, further include a shock absorbing member that is attached to the underside portion to absorb a mechanical shock between the underside portion and the glass plate so as to define the clearance between the shock absorbing member and the glass plate. The shock absorbing member can perform a shock absorption between the underside portion and the glass plate while allowing the condensed water to flow down through the clearance between the shock absorbing member and the glass plate to thereby prevent the condensed water from building up on the underside portion.

Specifically, it is more preferable that: the underside portion includes a base wall disposed along the glass plate and spaced from the glass plate; the shock absorbing member is attached to the base wall so as to cover an upper end of the base wall at both of a front side and a back side of the shock absorbing member and define the clearance between a region of the absorbing member which region covers the shock absorbing member on the side of the glass plate and the glass plate. The thus attached shock absorbing member, so provided as to cover the upper end of the base wall, is able to effectively inhibit the condensed water from being generated on the upper end of the base wall and further on the region lower than the upper end in the base wall.

In the above case, the underside portion can include, in addition to the base wall, a bulging wall integrally joined to a lower end of the base wall so as to bulge from the lower end of the base wall toward the inner side of the cabin, despite the existence of the shock absorbing member. This enables the underside portion to be effectively reinforced.

More specifically, preferable is that the bulging wall bulges obliquely upward from the lower end of the base wall and the underside portion has a bottom portion where the lower end of the base wall and a lower end of the bulging wall are joined to each other, the bottom portion formed with a water drainage hole passing therethrough. Even if the condensed water flows into the underside portion, the water drainage hole in the bottom portion allows the condensed water to pass through the water drainage hole to be discharged downwardly from the bottom portion, thus preventing the condensed water from building up in the underside portion. Besides, the water condensed on the base wall or the bulging wall can move down on the surface of the base wall or the bulging wall to thereby reach the water drainage hole, thus being allowed to be quickly and securely discharged. This ensures the prevention of the underside portion from rusting.

This application is based on Japanese Patent Application No. 2010-121334 filed on May 27, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A front window formed in a cabin of a construction machine, comprising:
   an upper window formed in a front face of the cabin; and
   a lower window disposed below the upper window so as to make contact with the upper window, wherein
   the upper window includes a window frame having an underside portion, and a glass plate having a periphery to be attached to an outer face of the window frame in such a manner as to define a clearance between the underside portion of the window frame of the upper window and the glass plate to let out condensed water generated on an inner face of the glass plate downwardly from the underside portion.

2. A front window formed in a cabin of a construction machine, comprising:
   an upper window formed in a front face of the cabin, the upper window including a window frame having an underside portion and a glass plate having a periphery to be attached to an outer face of the window frame in such a manner as to be spaced from the underside portion of the window frame of the upper window;
   a lower window disposed below the upper window so as to make contact with the upper window; and
   a shock absorbing member that is attached to the underside portion to absorb a mechanical shock between the underside portion and the glass plate so as to define a clearance between the shock absorbing member and the glass plate to let out condensed water generated on an inner face of the glass plate downwardly from the underside portion.

3. The front window according to claim 2, wherein
   the underside portion includes a base wall that is disposed along the glass plate and spaced from the glass plate and
   the shock absorbing member is attached to the base wall in such a manner as to cover an upper end of the base wall at both of a front side and a back side of the shock absorbing member and define the clearance between a region of the absorbing member which region covers the shock absorbing member on the side of the glass plate and the glass plate.

4. The front window according to claim 3, wherein
   the underside portion includes, in addition to the base wall, a bulging wall integrally joined to a lower end of the base wall so as to bulge from the lower end of the base wall toward the inner side of the cabin.

5. The front window according to claim 4, wherein
   the bulging wall bulges obliquely upward from the lower end of the base wall, and
   the underside portion has a bottom portion where the lower end of the base wall and a lower end of the bulging wall are joined to each other, the bottom portion being formed with a water drainage hole passing therethrough.

* * * * *